United States Patent
Ogasawara

(10) Patent No.: US 7,194,745 B2
(45) Date of Patent: Mar. 20, 2007

(54) HOLDING MECHANISM OF AN OPTICAL DISK CLAMPER AND AN OPTICAL DISK DRIVE USING THE SAME

(75) Inventor: Manabu Ogasawara, Chofu (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 563 days.

(21) Appl. No.: 10/243,801

(22) Filed: Sep. 13, 2002

(65) Prior Publication Data
US 2003/0053401 A1    Mar. 20, 2003

(30) Foreign Application Priority Data
Sep. 19, 2001 (JP) ............................. 2001-285132
Nov. 9, 2001 (JP) ............................. 2001-344692

(51) Int. Cl.
*G11B 17/022* (2006.01)
(52) U.S. Cl. ....................................... 720/604
(58) Field of Classification Search ............... 369/263, 369/77.1, 270; 360/98.08, 99.05, 99.12; 720/604
See application file for complete search history.

(56) References Cited

U.S. PATENT DOCUMENTS 5,959,959 A * 9/1999 Watanabe .................. 369/270

6,538,970 B1 * 3/2003 Fujiwara et al. ........... 369/77.1

FOREIGN PATENT DOCUMENTS

| JP | 63 130949 | | 8/1988 |
| JP | 2 128245 | | 10/1990 |
| JP | 06282916 A | * | 10/1994 |
| JP | 0 8017117 | | 1/1996 |
| JP | 1 0134463 | | 5/1998 |
| JP | 1 1224452 | | 8/1999 |
| WO | WO09812700 | * | 3/1998 |

* cited by examiner

*Primary Examiner*—Tianjie Chen
(74) *Attorney, Agent, or Firm*—Ladas & Parry LLP

(57) ABSTRACT

An optical disk clamper holding mechanism that holds an optical disk clamper includes a surrounding unit, a flange unit, a rib that touches, when the optical disk clamper moves in the direction of the flange opening, a rim portion of an upper flange unit of the optical disk clamper, the rib protruding inwardly at a position opposite to the flange opening. Since the range of clearance in which the optical disk clamper can move in the optical disk clamper holding mechanism is restricted, the optical disk clamper always fits in the turntable normally and consequently, always clamps the optical disk normally.

4 Claims, 16 Drawing Sheets

US 7,194,745 B2

HOLDING MECHANISM OF AN OPTICAL DISK CLAMPER AND AN OPTICAL DISK DRIVE USING THE SAME

BACKGROUND OF THE INVENTION

1. Field of the Invention

The present invention generally relates to an optical disk clamper, and more particularly, to the retracting mechanism of an optical disk clamper and an optical disk drive using the same.

2. Description of the Related Art

A type of optical disk drive has an optical disk clamper held in a holding unit. When an optical disk is set in such type of optical disk drive, a turntable moves upward and the optical disk clamper fits in and is magnetically attracted by the turntable so that the optical disk is clamped on the turntable. The optical disk clamper holding unit has an opening portion through which the optical disk clamper is built in, but supports the optical disk clamper so that the optical disk clamper does not come out once built in.

FIGS. 1A–1C are schematic diagrams showing a conventional optical disk clamper holding unit 10. This optical disk clamper holding unit 10 has a surrounding unit 11, a flange unit 12, and a built-in opening unit 13. The surrounding unit 11 is shaped like a ring of which a portion is removed. The removed portion corresponds to the built-in opening unit 13. Though the built-in opening unit 13 is formed as small as possible, no devisal is employed. The flange unit 12 protrudes inwardly from the surrounding unit 11.

The optical disk clamper is shaped like a reel, and has a hub unit 21, an upper flange unit 22, and a lower flange unit 23.

The optical disk clamper 20 is built in the optical disk clamper holding unit 10 through the built-in opening unit 13 by bending the lower flange unit 23. The hub unit 21 is positioned inside of the flange unit 12 and the upper flange unit 22 is supported by the flange unit 12 in the manner that the optical disk clamper is freely movable in the optical disk clamper holding unit 10, but does not come off through the built-in opening unit 13.

Oc is the center of the optical disk clamper 20, and Oh is the center of the optical disk clamper holding unit 10.

When the turntable moves with the optical disk, the optical disk clamper 10 fits in the turn table and is magnetically attracted by the turn table, the optical disk is clamped on the turn table.

The range of clearance in which the optical disk clamper 20 is movable in the holding unit 10 will be considered as below. The optical disk clamper 20 can move in the direction of X1, X2, and Y1 until the hub unit 21 touches the flange unit 12. As showed in FIG. 1B, the optical disk clamper 20 can move the distance δX1 in the X1 direction. In the direction toward the opening unit 13, that is, the Y2 direction, however, the optical disk clamper 20 can move, as showed in FIG. 1C, until the upper flange unit 22 touches the edges 11a and 11b of the surrounding unit 11, that is, the distance δY2.

The distance δY2 is about twice the distance δY1. If the optical disk clamper 20 is moved in the holding unit 10 in the Y2 direction, there is a risk that, when the turntable moves upward with the optical disk, the optical disk clamper 10 does not fit in the turn table and the optical disk is not normally clamped.

By the way, FIG. 2 is a schematic diagram showing a conventional heat radiation mechanism of an electronic component. The heat radiation mechanism showed in FIG. 2 is employed by disk drives such as CD-R. In this heat radiation mechanism, the heat generated by a semiconductor component 220 is radiated by a bottom cover 250 that carries out the function of a heat radiation plate.

The leads 230 of the semiconductor component 220 are connected and fixed to a circuit board 210 with soldering 240. The semiconductor component 220 generates heat when it is operated.

The bottom cover 250 is attached to the disk drive so that the bottom cover 250 faces the circuit board 210. This bottom cover 250 is made of highly conductive metal plate and functions as a heat radiation plate. A heat radiation unit 260 is formed at the position opposed to the semiconductor component 220 on the bottom cover 250 so that the distance between the bottom cover 250 and the semiconductor component 220 becomes small.

Conventionally, a heat radiation sheet 270 is provided on the semiconductor component 220 to thermally connect the semiconductor component 220 and the bottom cover 250 so that this heat radiation sheet 270 touches the bottom cover 250 (heat radiation unit 260) when the bottom cover 250 is attached to the optical disk drive. The heat generated by the semiconductor component 220 is transferred to the bottom cover 250 through the heat radiation sheet 270 and radiated by the bottom cover 250.

However, in the case of the above structure wherein the heat radiation mechanism uses a portion of an apparatus (a disk drive in this case) into which the heat radiation mechanism is built as an element of the heat radiation mechanism, the performance of the heat radiation mechanism is affected by assembly error of the apparatus, manufacturing error of components, and tolerances (hereinafter, these are referred to as "assembly errors" as a whole).

That is, in the case where the assembly errors exist when the bottom cover 250 is assembled to the disk drive, and/or the case where the assembly errors exist when the circuit board 210 is assembled to the disk drive, the heat radiation sheet 270 may not touch the bottom cover 250 (heat radiation unit 260) as showed in FIG. 3. If the heat radiation sheet 270 does not touch the bottom cover 250, the heat generated by the semiconductor component 220 is not efficiently transferred to the bottom cover 250.

SUMMARY OF THE INVENTION

Accordingly, it is an object of the present invention to provide a novel and useful optical disk clamper holding unit and an optical disk drive by which the problem described above is eliminated.

To achieve the above object, an optical disk clamper holding mechanism that holds an optical disk clamper having a hub, an upper flange unit, and a lower flange unit, according to an embodiment of the present invention, includes a surrounding unit that holds said upper flange unit, a flange unit that supports said upper flange unit and holds said hub unit, said flange unit being shaped like a semicircle, projecting inwardly from said surrounding unit and having a flange opening unit between edges in the circumferential direction, a rib that stops, when said optical disk clamper moves in the direction of said flange opening unit, a rim portion of said upper flange unit of said optical disk clamper, said rib protruding inwardly at a position opposite to said flange opening unit.

Compared to the conventional optical disk clamper holding unit, the range of clearance in which the optical disk clamper can move in the optical disk clamper holding mechanism is restricted. Accordingly, the optical disk clamper always fits in the turntable normally and consequently, always clamps the optical disk normally. The optical disk clamper holding mechanism according to the present invention improves the reliability of clamping.

Other objects, features, and advantages of the present invention will become more apparent from the following detailed description when read in conjunction with the accompanying drawings.

DETAILED DESCRIPTION OF THE PREFERRED EMBODIMENTS

Figure 1A:
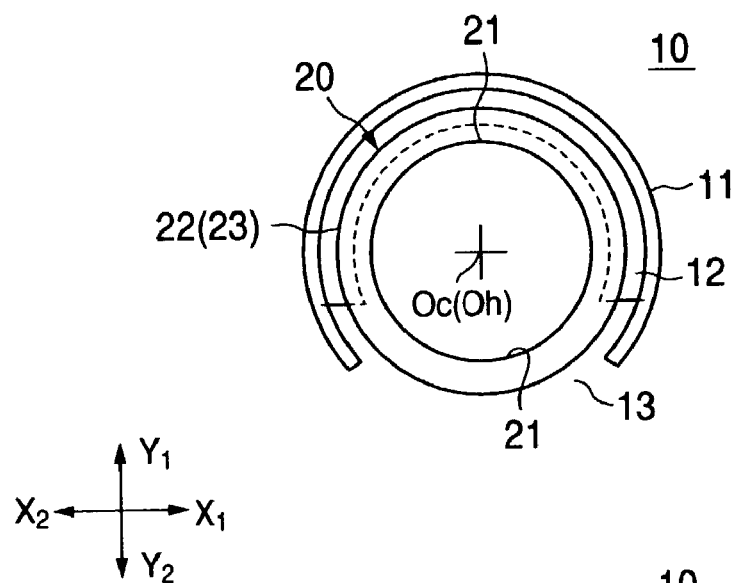
FIGS. 1A–1C are schematic diagrams showing an optical disk clamper holding unit according to the related art.
Figure 1B:
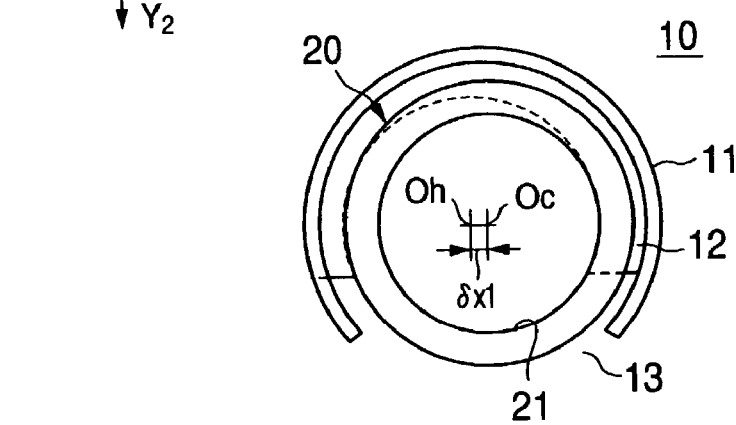
Figure 1C:
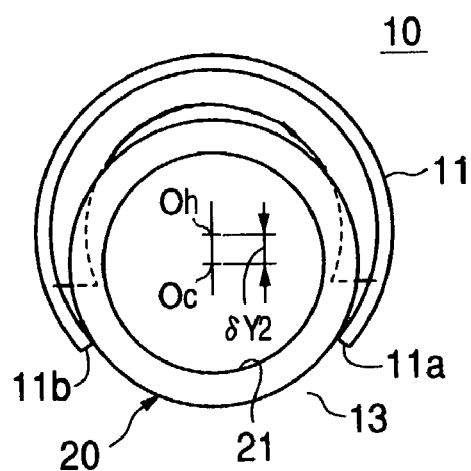
Figure 2:
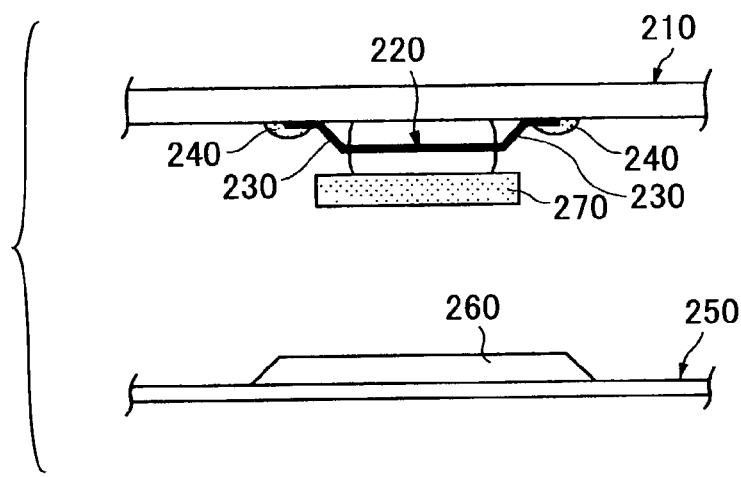
FIG. 2 is schematic diagram showing a conventional heat radiation mechanism where the heat radiation sheet is separated from the bottom cover.
Figure 3:
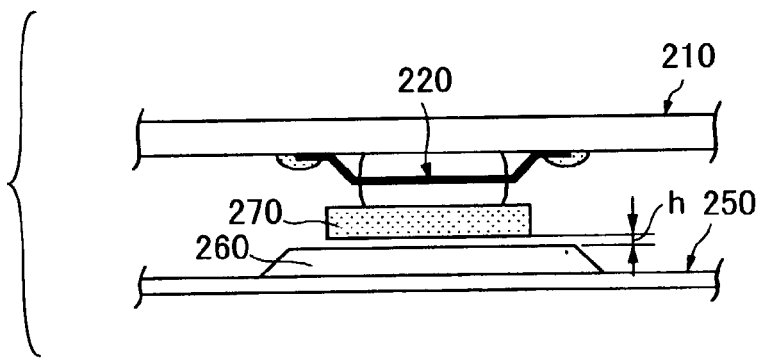
FIG. 3 is schematic diagram showing the conventional heat radiation mechanism that inherits problems.
Figure 4:
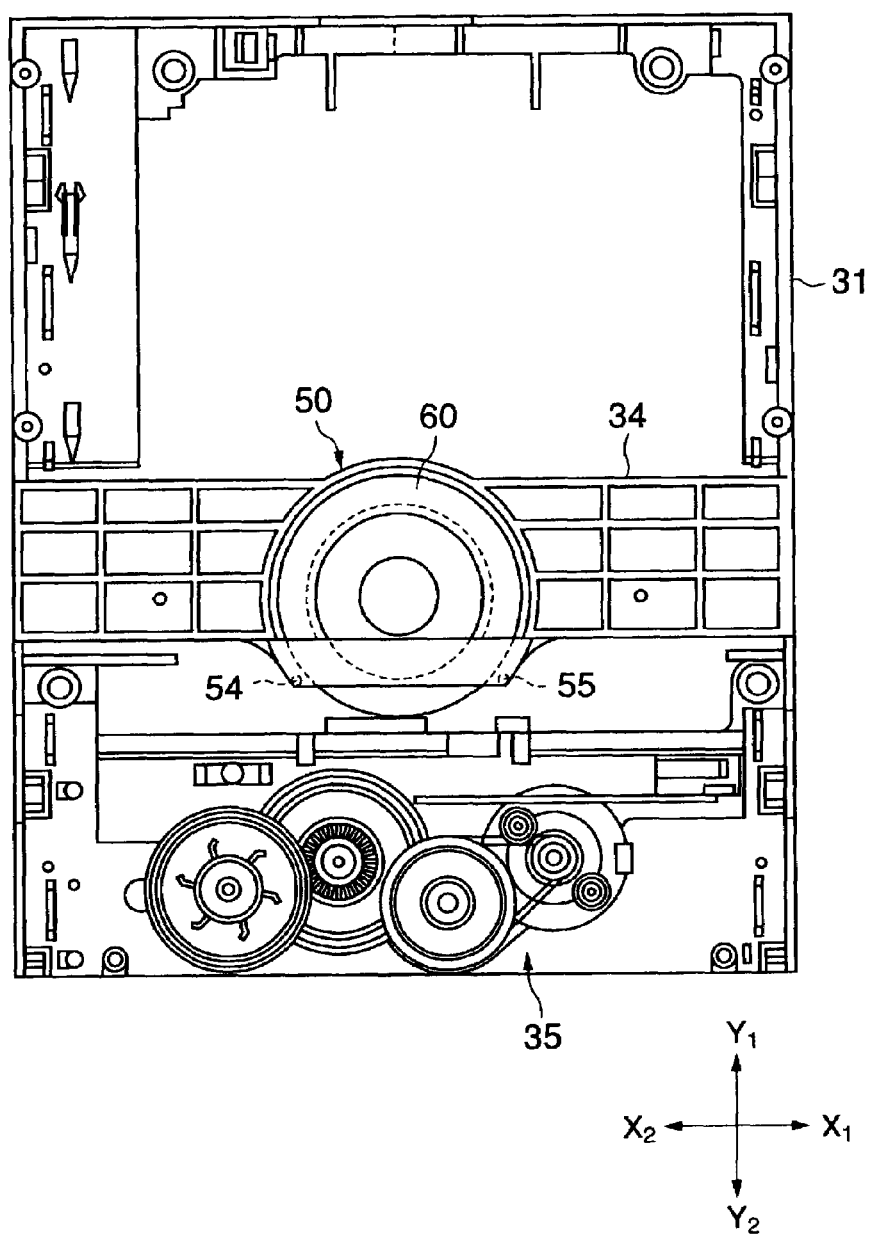
FIG. 4 is top view of an optical disk drive (a base unit assembly) according to an embodiment of the present invention.
Figure 5A:
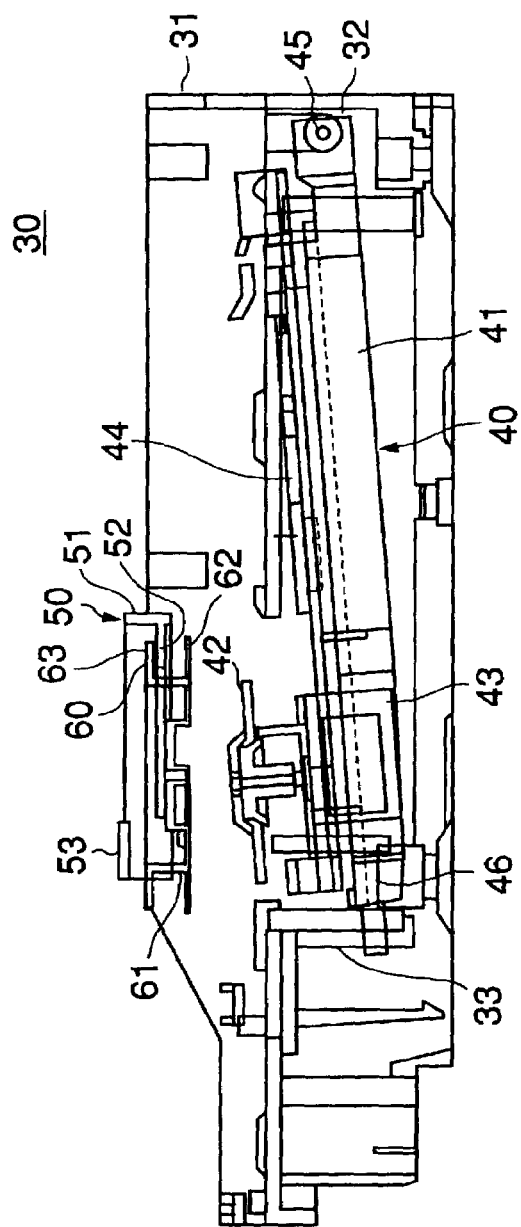
FIGS. 5A and 5B are side views of the optical disk drive according to an embodiment.
Figure 5B:
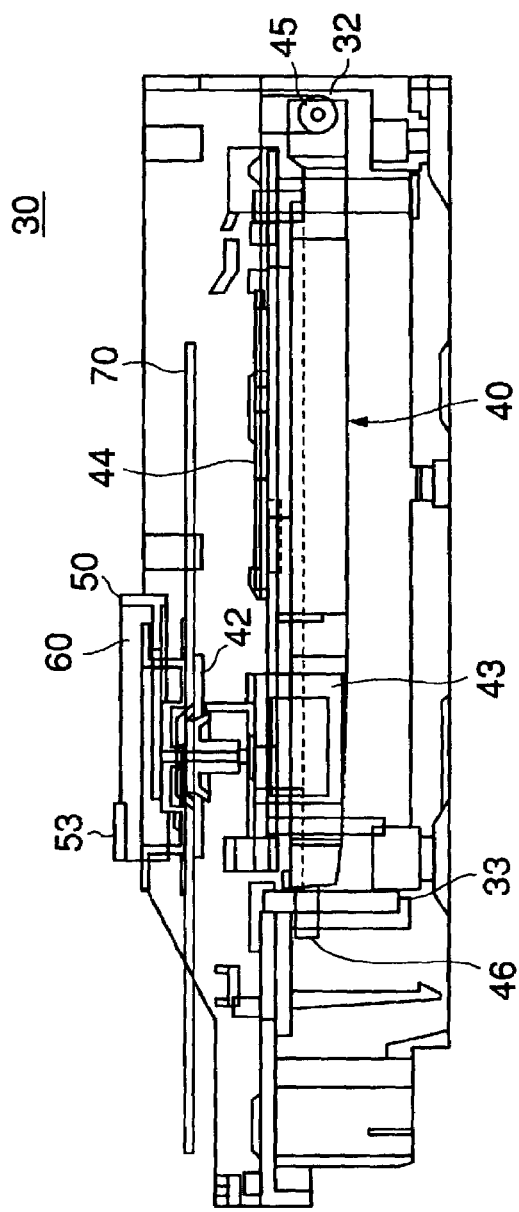

A description of the preferred embodiments of the present invention will be given after a brief description of an optical disk drive. FIG. 4 is a top view showing an optical disk drive 30. A disk tray and an optical base unit assembly are not shown in FIG. 4. FIGS. 5A and 5B are side views showing the optical disk drive 30. The disk tray is not shown. The arrow X1-X2 indicates the width direction of the optical disk drive 30; the arrow Y1-Y2 indicates the depth direction of the optical disk drive 30; and the arrow Z1-Z2 indicates the height direction of the optical disk drive 30.

The optical disk drive 30 includes a housing 31 that is a box made of synthetic resin, a disk tray (not showed), and an optical base unit assembly 40. The optical disk drive 30 is horizontally built into the system unit of a computer and so forth.

The optical base unit assembly 40 is provided with a square supporting base 41, a turn table 42, a motor 43 that rotates the turn table 42, an optical head 44 that reads information recorded in an optical disk 70, and a motor (not showed) that actuates the optical head 44. The supporting base 41 has an axis 45 that is located on the Y1 side of the supporting base 41 and protrudes in the X1-X2 direction. The axis 45 is supported by a bearing 32 of the housing 31. The supporting base 41 further has a rod 46 that is located on the Y2 side of the supporting base 41. The rod 46 is supported by a cam ditch formed on a cam member 33 fixed on the housing 31. Accordingly, the optical base unit assembly 40 is supported in the housing 31. As showed in FIG. 5A, when the optical disk drive 30 is not being operated, the optical base unit assembly 40 tilts with the Y2 side of the optical base unit assembly 40 moved downward. The turntable 42 is positioned at a lower level. The optical disk 70 is, for example, a CD, a CD-ROM, a CD-R, a CD-RW, and a DVD.

Figure 6:
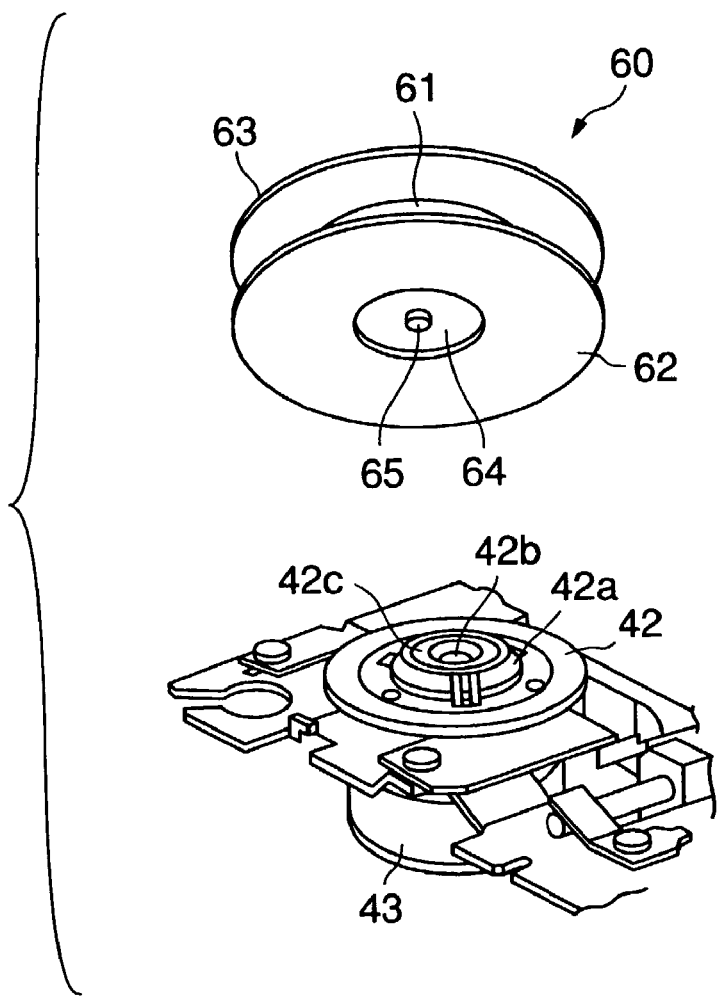
FIG. 6 is perspective view of an optical disk clamper and a turntable according to an embodiment.

As showed in FIG. 6 the turntable 42 is provided with a cone trapezoid shaped convex unit 42a at the center of the turntable 42, a hole unit 42b at the center of the convex unit 42a, and a ring-shaped permanent magnet 42c fixed on the top face of the convex unit 42a. FIG. 6B shows the structure of the turntable 42 in detail.

The housing 31 has a bridge unit 34 crossing in the X1-X2 directions at the top face side, and an optical disk clamper holding unit 50 at the center of the bridge unit 34. An optical disk clamper 60 (showed in FIG. 6A) is built into this optical disk clamper holding unit 50 with some clearance as showed in FIGS. 4 and 5A.

The optical disk clamper 60 is a reel shaped component made of synthetic resin that has a hub unit 61, upper flange unit 63, and a lower flange unit 62. The optical disk clamper 60 is provided with a concave unit 64 at the center of the bottom face and a convex unit 65 protruding downward at the center of the concave unit 64. The convex unit 65, a ring shaped steel member, is built into the concave unit 64.

When the disk tray is actuated by a disk tray moving mechanism 35 to set an optical disk 70 in the housing 31, the cam member 33 moves in the X2 direction, the cam ditch pushes up the rod 46, and the optical base unit assembly is set at a horizontal position as showed in FIG. 5B. The optical disk 70 of which the rim around the center hole is supported by the turntable 42 floats over the disk tray, and the optical disk clamper 60 is slightly pushed up. The convex unit 42a fits in the concave unit 64, and the hole unit 42b also fits around (receives) the convex unit 65. Since the steel convex unit 65 is attracted by the permanent magnet 42c, the optical disk 70 is clamped on the turntable 36. Then, a motor 43 is activated to rotate the optical disk 70 and the information recorded in the optical disk 70 is read by the optical head 44. While being rotated, the optical disk clamper 60 remains at a position in which it does not touch the optical disk clamper holding unit 50.

When the optical disk drive 10 is instructed to stop, it reverses the operation of loading. The optical base unit assembly 30 tilts as showed in FIG. 5A, and the disk tray is subsequently moved in the Y2 direction. The optical disk is released from the clamp and discharged out of the housing 31.

The optical disk clamper holding unit 50 will be described next.

Figure 7:
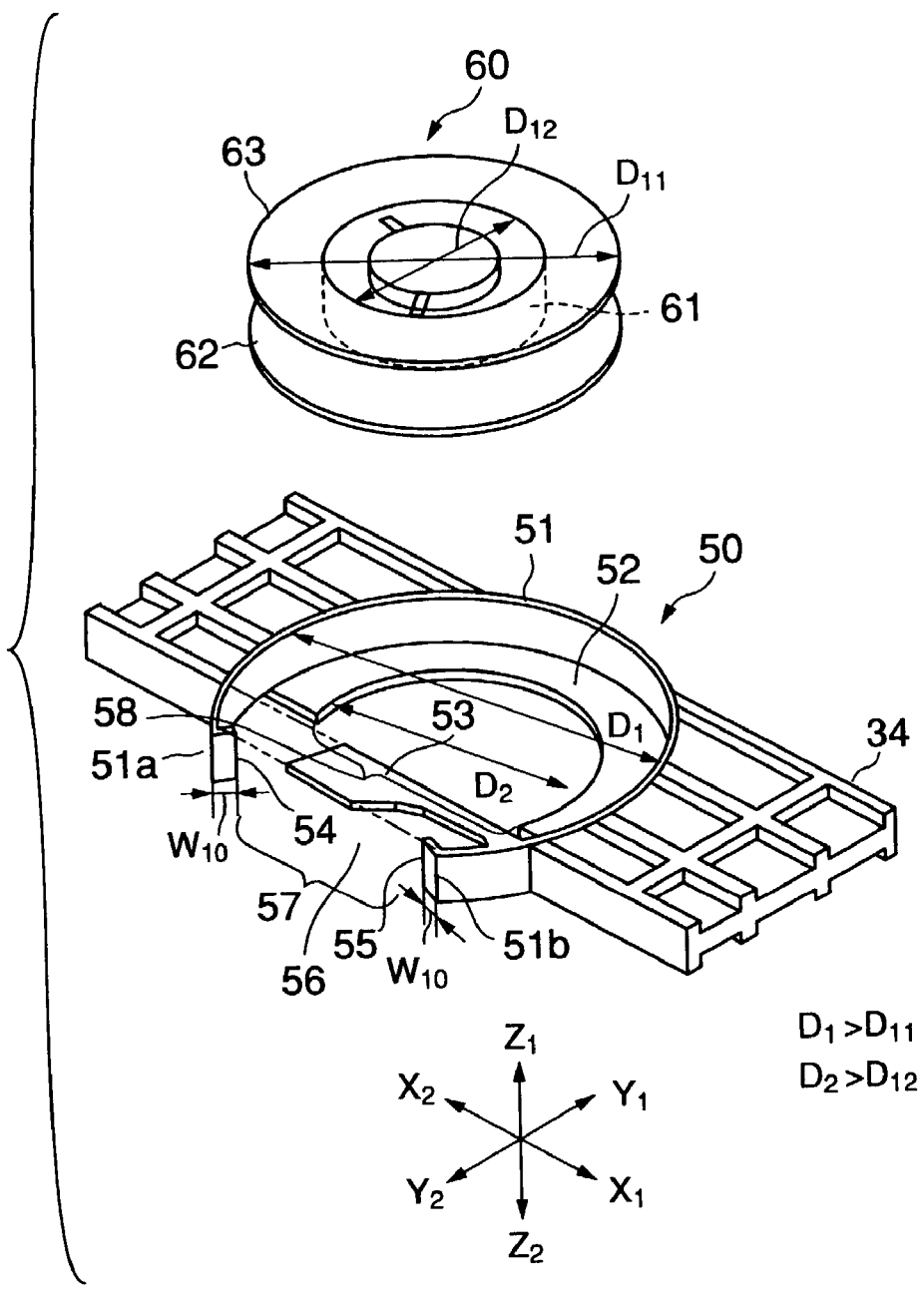
FIG. 7 is perspective view of an optical disk clamper and an optical disk clamper holding unit according to an embodiment.
Figure 8:
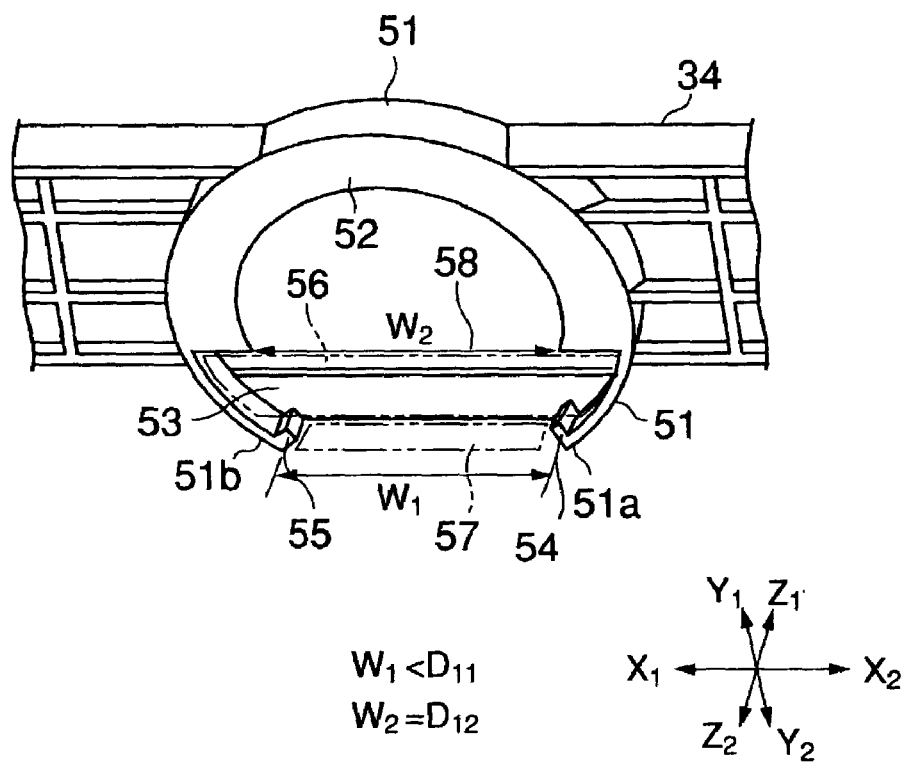
FIG. 8 is another perspective view of the optical disk clamper holding unit showed in FIG. 7.

As showed in FIGS. 7A, 7B and 8, the optical disk clamper holding unit 50 is a shaped component made of synthetic resin. It has a surrounding unit 51, a flange unit 52, a connection unit 53, ribs 54, 55, a built-in opening unit 56, and opening units 57, 58.

The surrounding unit 51 is shaped like a ring, of which a portion of ¼ is removed. The removed portion is the opening unit 57. The surrounding unit 51 holds the upper flange unit 63 of the optical disk clamper 60.

The flange unit 52 inwardly protrudes from the Z2 side of the surrounding unit 51 and is substantially shaped like a semicircle. The opening 58 is provided between the two end edges of the flange 52 in the circumferential direction. The built-in opening unit 56 is formed between the flange opening unit 58 and the surrounding opening unit 57.

The inner diameter D1 of the surrounding unit 51 is greater than the diameter D11 of the upper flange unit 63 of the optical disk clamper 60. The inner diameter D2 of the flange unit 52 is greater than the diameter D12 of the hub unit 61 of the optical disk clamper 60. The opening unit 57 is in the X-Z plane, and the built-in opening unit 56 is in the X-Y plane. As showed in FIG. 8, W1 indicates the width of the opening unit 57 in the X1-X2 directions, and at the same time, is the width of the Y2 edge of the built-in opening unit 56. W1 is shorter than the diameter D11 of the upper flange unit 63 of the optical disk clamper 60. The width W1 is the shortest length wherein the optical disk clamper 60 can be built into the optical disk clamper holding unit 50. W2 indicates the width of the flange opening unit 58 in the X1-X2 directions, and is equal to the diameter D12 of the hub unit 61 of the optical disk clamper 60.

The connection unit 53 stretches in the X1-X2 directions and connects both edges of the surrounding unit 51 at the upper side. The connection unit 53 reinforces the portion of the surrounding unit 51 that protrudes from the bridge unit 34 in the Y2 direction.

The ribs 54, 55 protrude from the respective edges 51a, 51b of the surrounding unit 51 in the radial direction toward the center Oh of the optical disk clamper holding unit 50. The width of the ribs 54 and 55 is W10. The ribs 54 and 55 reduce the clearance of the optical disk clamper 60 in the Y2 direction in the disk clamper holding unit 50 without making it difficult to build the optical disk clamper 60 into the optical disk clamper holding unit 50. The ribs 54 and 55 are formed in the portion of the surrounding unit 51 that is opposite to the flange opening unit 58.

Figure 9A:
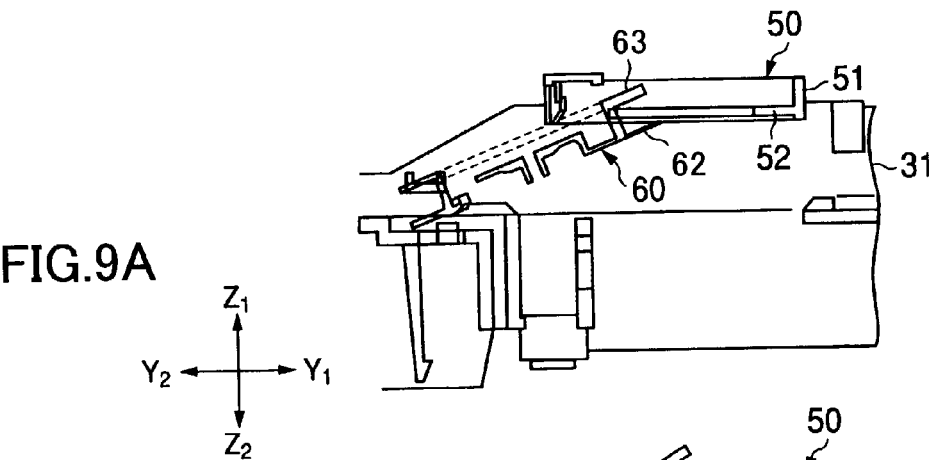
FIGS. 9A–9E are schematic diagrams showing the process in which an optical disk clamper is built into the optical disk clamper holding unit showed in FIG. 7.
Figure 9B:
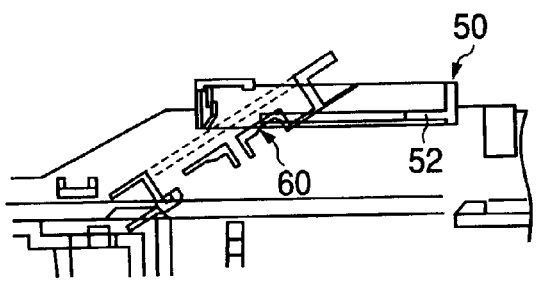
Figure 9C:
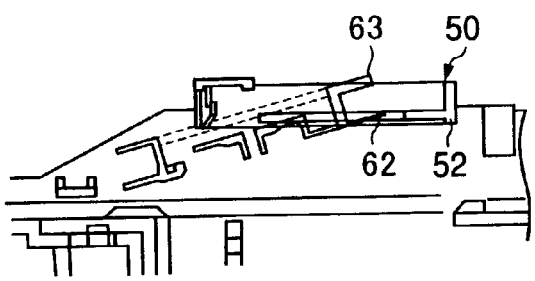
Figure 9D:
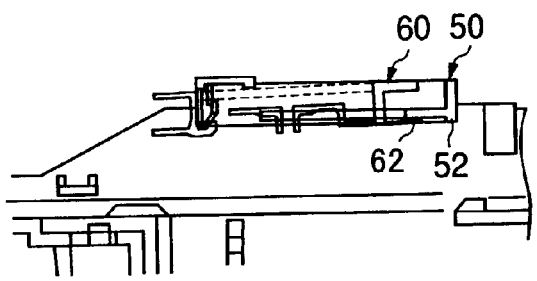
Figure 9E:
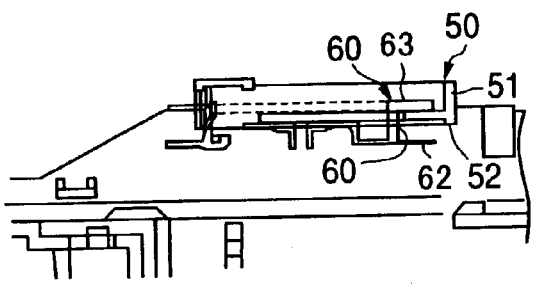

When one builds the optical disk clamper 60 into the optical disk clamper holding unit 50 as showed in FIG. 9E, he/she slants the optical disk clamper 60 as showed in FIG. 9A, and inserts an upper portion of the optical disk clamper 60 into the built-in opening unit 56 until the upper flange unit 63 comes to above the flange unit 52. As showed in FIGS. 9B, 9C, and 9D, the optical disk clamper 60 is pushed into the optical disk clamper holding unit 50 and, at the same time the Y2 side of the optical disk clamper 60 is pulled up so that the optical disk clamper 60 returns to the horizontal position. He/she slightly bends the lower flange unit 62 to put it under the flange unit 52. The hub unit 61 enters the inside of the flange unit 52 through the flange opening unit 58. The ribs 54 and 55 do not disturb the optical disk clamper 60 when the optical disk clamper 60 is built into the optical disk clamper holding unit 50.

As showed in FIGS. 4, 5A, 9A, and 10A, when the optical disk clamper 60 is built into the optical disk clamper holding unit 50, the hub unit 61 is positioned in the flange unit 52 and the upper flange unit 63 is supported by the flange unit 52. A portion of the upper flange unit 63 protrudes from the optical disk clamper holding unit 50 in the Y2 direction. The optical disk clamper 60 is movable in the optical disk clamper holding unit 50, but it is supported so that it does not come off through the flange opening unit 58. Oc indicates the center of the optical disk clamper, and Oh indicates the center of the optical disk clamper holding unit 50.

The range of clearance in which the optical disk clamper 60 is movable in the holding unit 50 will be discussed below.

Figure 10A:
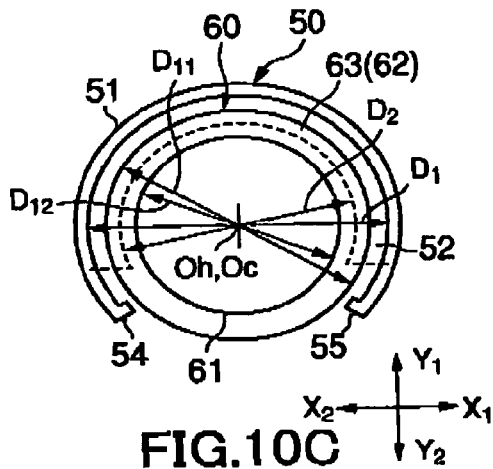
FIGS. 10A–10F are schematic diagrams showing the movable range of an optical disk clamper in the optical disk clamper holding unit showed in FIG. 7.
Figure 10B:
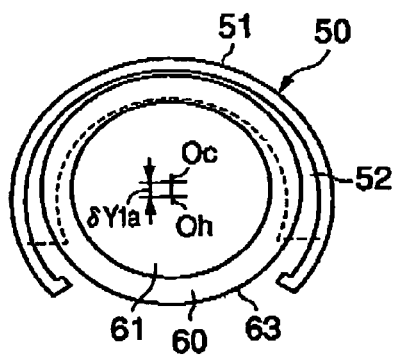
Figure 10C:
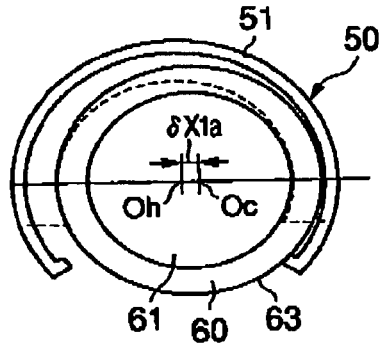
Figure 10D:
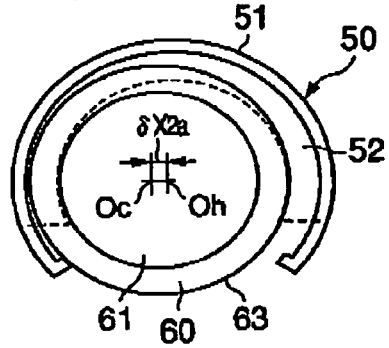

As showed in FIGS. 10B, 10C, and 10D, the movement of the optical disk clamper 60 in the direction of Y1, X1, and X2 is restricted because the hub unit 61 touches the inner edge 52a of the flange 52. The ranges in which the optical disk clamper 60 can move freely are $\delta Y1a$, $\delta X1a$, and $\delta X2a$, respectively, all of which are small.

Figure 10E:
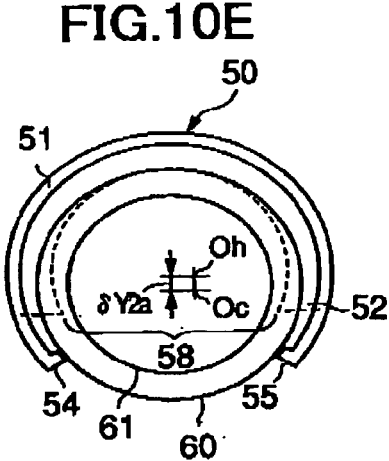
Figure 10F:
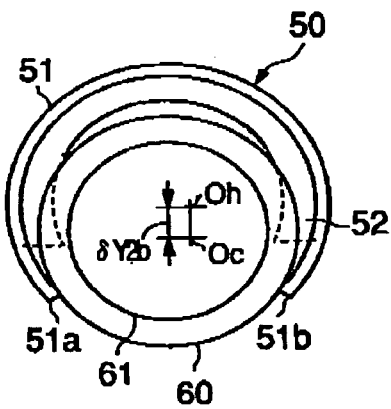

As showed in FIG. 10E, in the case of the direction in which the optical disk clamper 60 comes out through the flange opening unit 58, that is, the Y2 direction, the movement of the optical disk clamper 60 is restricted because the rim portion of the upper flange unit 63 of the optical disk clamper 60 on the Y2 side touches the ribs 54 and 55. The range in which the optical disk clamper 60 can move in the Y2 direction is $\delta Y2a$.

If the ribs 54 and 55 do not exist, the optical disk clamper 60 moves until the rim portion of the upper flange unit 63 of the optical disk clamper 60 on the Y2 side touches the edge portions 51a and 51b of the surrounding unit 51 in the circumferential direction. The movable range becomes $\delta Y2b$.

The above range $\delta Y2a$ is about a half of the range $\delta Y2b$, and is at the same size range as the above ranges $\delta Y1a$, $\delta X1a$, and $\delta X2a$.

Accordingly, since the ribs 54 and 55 are provided, the movable range in which the optical disk clamper 60 can move in the holding unit 50 becomes equally short in all the directions. Whichever direction the optical disk clamper 60 is moved, an optical disk 70 is clamped normally, when the turntable moves upward with the optical disk 70 as showed in FIGS. 5A and 5B, since the convex unit 42a surely fits in the concave unit 64 and the hole unit 42b surely fits around and receives the convex unit 65.

Figure 11:
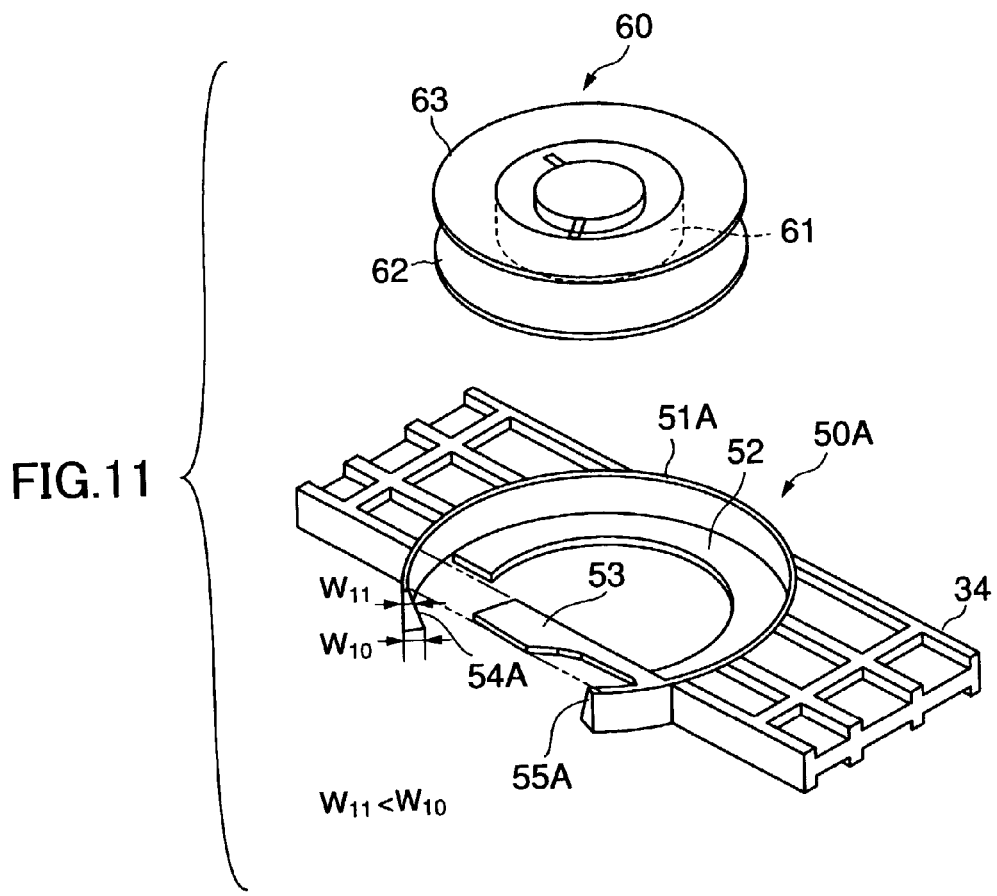
FIG. 11 is perspective view of an optical disk clamper and an optical disk clamper holding unit according to another embodiment.

FIGS. 11A and 11B show another embodiment of the present invention. In FIGS. 11A and 11B, elements corresponding to those showed in FIGS. 7A and 7B are referred to by the same numerals. An optical disk clamper holding unit 50A has ribs 54A and 55A. The ribs 54A and 55A are each shaped like a triangle of which the width W11 at the Z1 side is shorter than the width W10.

According to this structure, when the optical disk clamper 60 is slightly pushed up in the Z1 direction in the optical disk clamper holding unit 50A to clamp the optical disk 70, the distance between the rim portion of the upper flange unit 63 of the optical disk clamper 60 and the ribs 54A and 55A becomes greater compared to the distance before the optical disk clamper 60 is pushed upward. Accordingly, when the optical disk clamper 60 is rotated in the optical disk clamper holding unit 50A, the risk that the optical disk clamper 60 touches the ribs 54A and 55A is eliminated.

Figure 12:
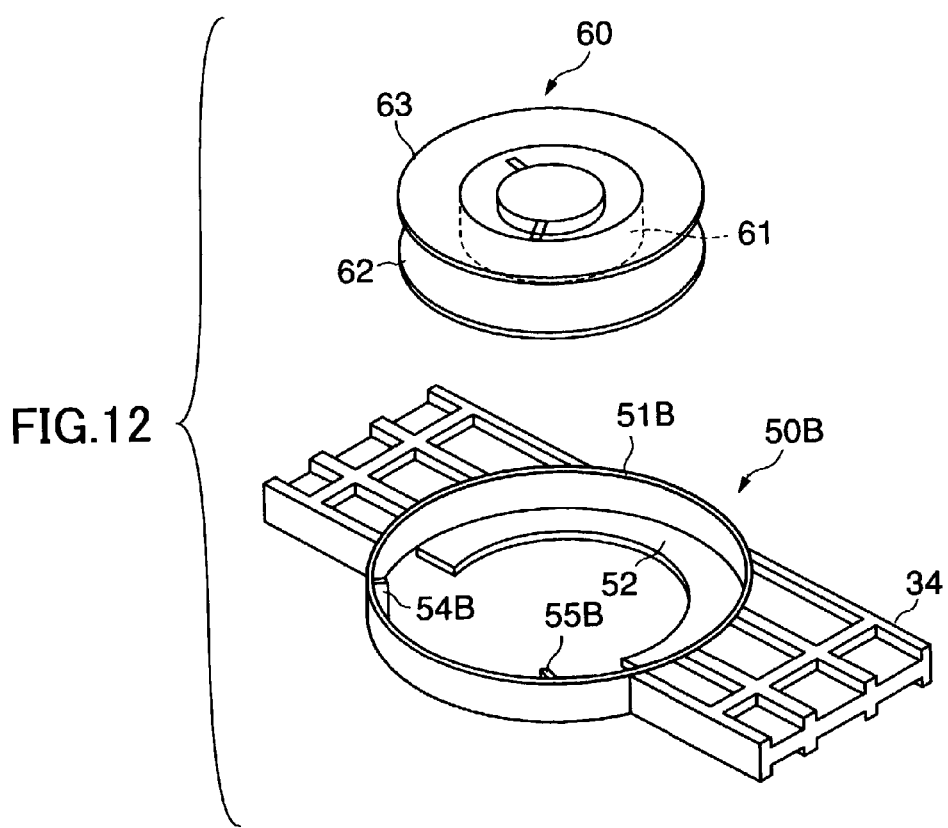
FIG. 12 is perspective view of an optical disk clamper and an optical disk clamper holding unit according to yet another embodiment.

FIGS. 12A and 12B show an optical disk clamper holding unit 50B according to yet another embodiment of the present invention. In FIGS. 12A and 12B, elements corresponding to those showed in FIGS. 7A and 7B are referred to by the same numerals. The surrounding unit 51B is shaped like a ring, but no portion of the ring is removed. The surrounding unit 51B does not have an opening unit corresponding to the opening unit 57 showed in FIG. 7B. Ribs 54B and 55B are formed at positions on the inner face of the surrounding unit 51B opposite to the flange opening unit 58.

As described above, according to an aspect of the present invention, a rib is provided on the surrounding unit at a position opposing the flange opening unit, the rib protruding toward the inside of the surrounding unit. When the optical disk clamper moves in the direction to the opening unit in a manner so that the optical disk clamper comes off through the opening unit, the rib stops the rim portion of the upper flange unit of the optical disk clamper. Accordingly, the range of clearance in which the optical disk clamper can move in the optical disk clamper holding unit in the direction toward the opening unit is restricted. Consequently, the optical disk clamper always fits in the turntable normally, and the reliability of the clamping of an optical disk is improved. The rib, however, does not disturb the assembly of the optical disk clamper and the optical disk clamper holding unit.

According to another aspect of the present invention, the width at the upper side of the rib described above may be shorter than the width at the lower side of the rib. Accordingly, in the case the optical disk is clamped and, as a result, the optical disk clamper is slightly pushed up, the gap between the rim portion of the upper flange unit of the optical disk clamper and the rib becomes greater, compared to the gap before the optical disk clamper is pushed up. Consequently, the risk of the optical disk clamper touching the rib while the optical disk clamper is rotating is eliminated.

According to yet another aspect of the present invention, an optical disk drive can have the optical disk clamper holding unit described above, a turn table that clamps the optical disk with the optical disk clamper, and an optical head that reads information recorded in the optical disk rotated by the turn table. Accordingly, it is possible to improve the reliability of clamping for the optical disk drive.

Figure 13:
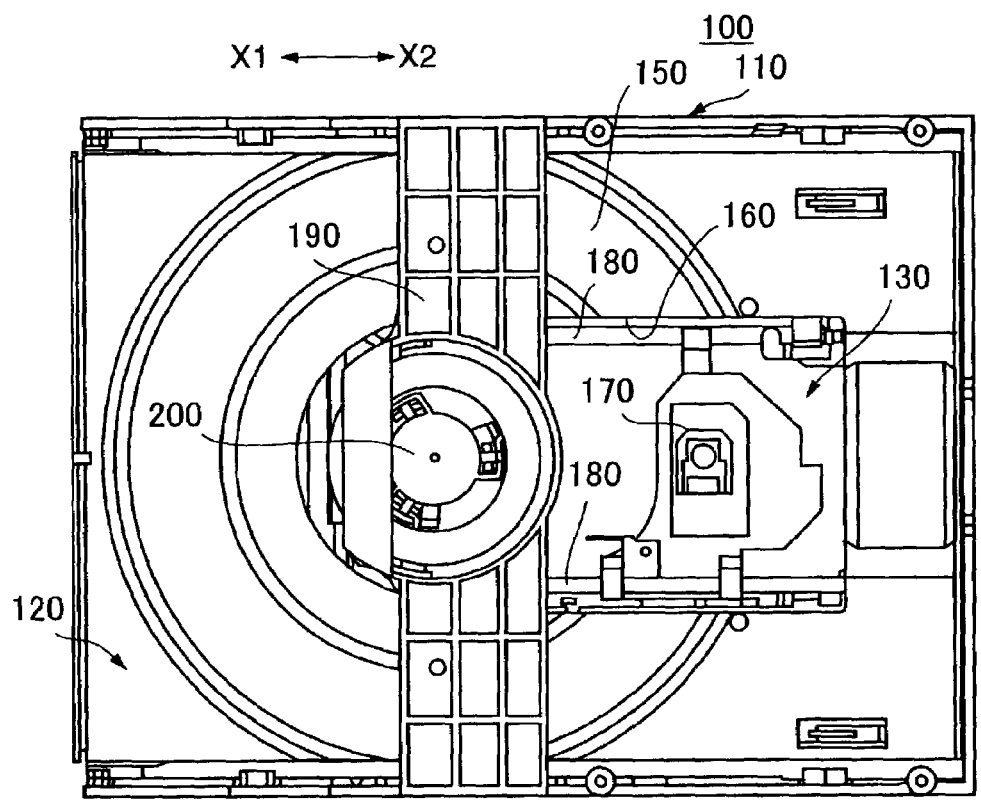
FIG. 13 is a top view of a disk drive in which a heat radiation mechanism is employed according to an embodiment.
Figure 14:
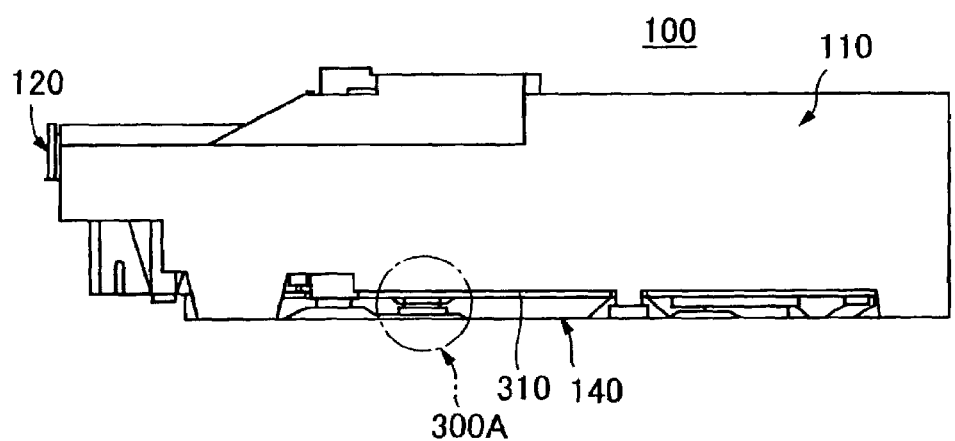
FIG. 14 is a side view of the disk drive showed in FIG. 13.
Figure 18:
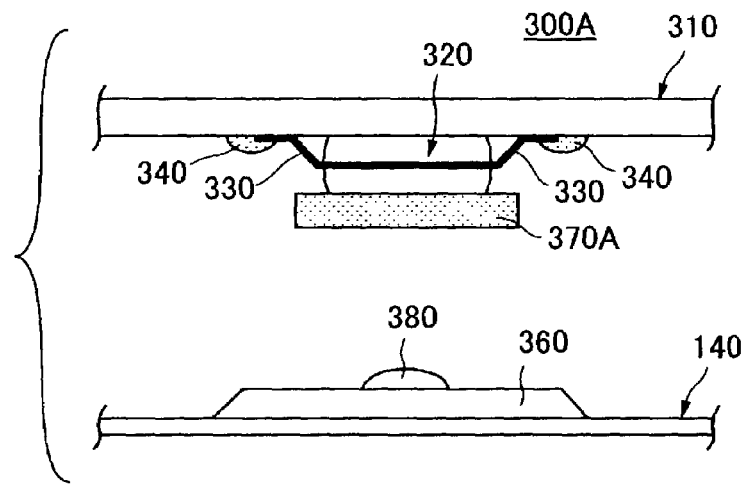
FIG. 18 is an expanded side view of a heat radiation mechanism according to an embodiment.
Figure 19:
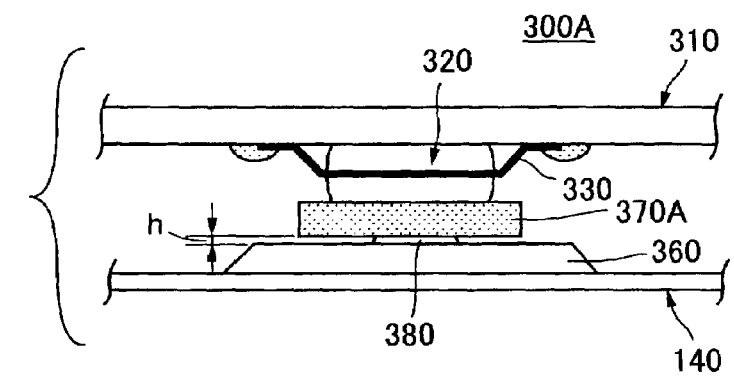
FIG. 19 is an expanded side view of the heat radiation mechanism showed in FIG. 18.

By the way, FIGS. 18 and 19 show a heat radiation mechanism 300A for an electronic component according to an embodiment of the present invention. This heat radiation mechanism 300A can be built in a disk drive 100 showed in FIGS. 13–15, for example. A brief description on the disk drive 100 will be given before the heat radiation mechanism 300A.

The disk drive 100 is, for example, a CD-R/CD-RW drive. The disk drive 100 mainly includes a base chassis 110, a tray 120, a traverse base 130, a bottom cover 140, and a circuit board 310.

The base chassis 110 is shaped like a box, and each component constituting the disk drive 100, such as the tray 120, the traverse base 130, the bottom cover 140, is provided inside of the base chassis 110. A bridge unit 190 is provided over the base chassis 110 as showed in FIG. 13, and a clamper 200 is built in at the center of the bridge unit 190. When a disk is set at the disk drive 100, the clamper 200 and a turntable (not showed) provided in the traverse base 130 together clamp the disk and rotate it at a predetermined rotative speed.

The tray 120 can move in the directions indicated by an arrow X1-X2. A disk supporting unit 150 is formed on the tray 120 to support the disk. In the case where the tray 120 moves in the X1 direction relative to the base chassis 110 (eject state), the disk is set in or removed from the tray 120. When the tray 120 moves in the X2 direction relative to the base chassis 110 (loading state), the disk is clamped between the clamper 200 and the turntable and rotated. The optical pickup 170 reads and/or writes information in the disk.

The traverse base 130 moves up and down relative to the tray 120. The traverse base 130 is provided with the turntable and the optical pickup 170 as described above. The optical pickup 170 is supported by guiding shafts 180 at both sides, and moves in the radial direction (indicated by an arrow X1-X2) of the disk loaded in the disk drive 100 to write and read information in the disk.

In addition, the tray 120 is provided with an opening unit 160. The above turntable meets the clamper 200 through this opening unit 160, and the optical pickup 170 performs reading and writing operations through the opening unit 160.

While the tray 120 is moving to eject or load the disk, the turn table stays at a lower position so that the turn table does not disturb the motion of the tray 120. When the tray 120 moves to the loading position, the turntable and the traverse base 130 move upward together to clamp the disk by fitting in the clamper 200.

The traverse base 130 is positioned so that the traverse base 130 covers the circuit board 310 provided at the bottom of the base chassis 110. The circuit board 310 is provided with various electronic components such as a semiconductor component 320. These electronic components write and read information in the disk, and actuate various actuators (such as actuating mechanisms of the tray 120).

If the circuit board 310 is exposed to the exterior of the disk drive, the circuit board 310 may gather dust or the electronic components such as the semiconductor component 320 may be damaged. The bottom cover 140 is provided so that the circuit board 310 does not gather dust and the electronic components are not damaged. The bottom cover 140 is made of metal plate such as steel plate having high thermal conductivity.

Figure 15:
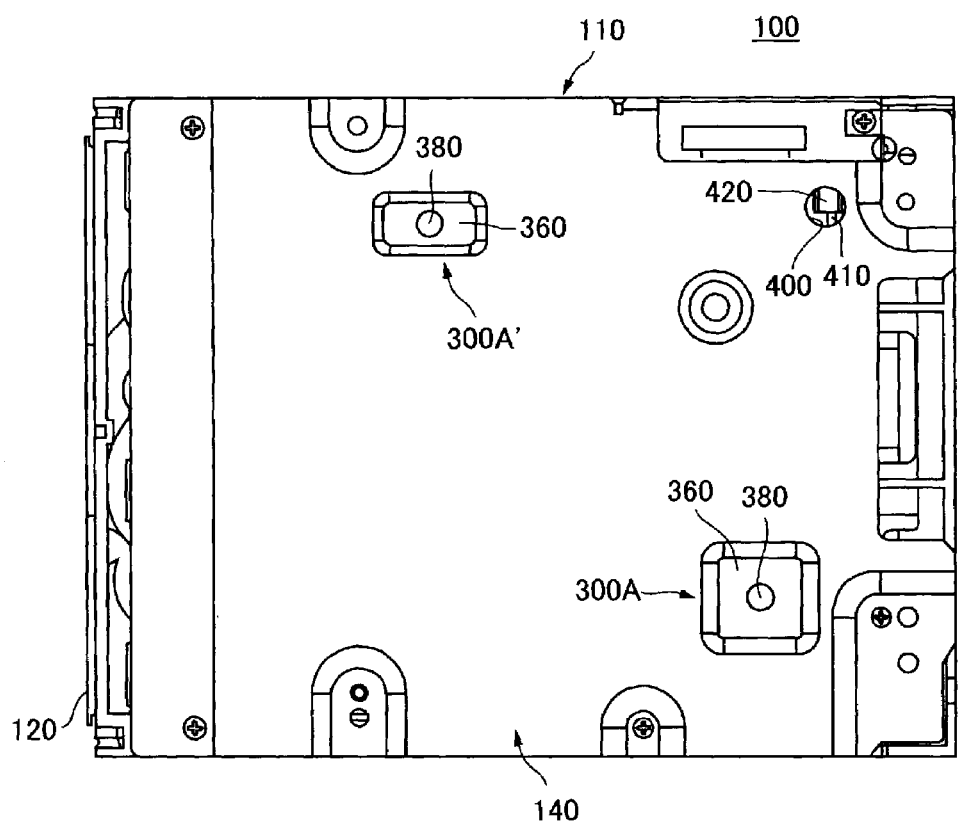
FIG. 15 is bottom view of the disk drive showed in FIG. 13.

FIG. 15 is bottom view of the disk drive 100 showing the bottom cover 140 provided at the bottom of the base chassis 110. As showed in the figure, a heat radiation mechanism 300A and a checking window 400 are formed on the bottom cover 140.

Figure 16:
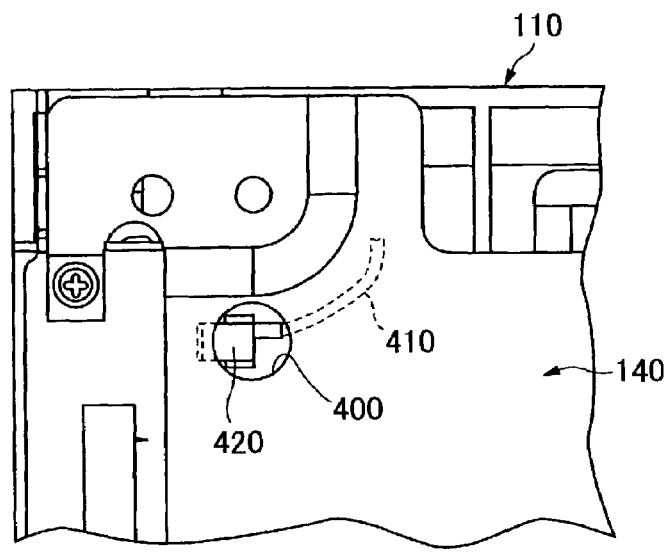
FIG. 16 is a schematic diagram showing a checking window provided in a disk drive.

The checking window 400 is described by reference to FIG. 16 in addition to FIG. 15. A ground harness 410 is connected to the circuit board 310. This ground harness 410 is connected to a connector 420 provided on the circuit board 310. The ground harness must be connected to the, circuit board 310 so that the electronic circuit provided on the circuit board 310 is normally operated. An inspection is performed to assure that the ground harness 410 is surely connected to the circuit board 310.

Figure 17:
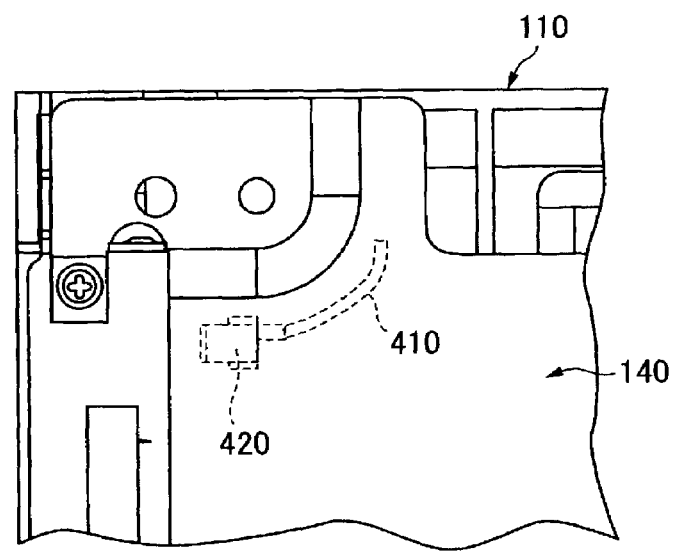
FIG. 17 is a schematic diagram showing a disk drive having no checking window.

This inspection is performed after the bottom cover 140 is assembled on the base chassis 110 since the ground harness 410 may come off the connector 420 when the bottom cover 140 is assembled on the base chassis 110. However, it is very difficult to check whether the ground harness 410 is connected to the connector 420 after the bottom cover 140 is assembled on the base chassis 110 because, conventionally, the position where the connector 420 is provided is covered by the bottom cover 140 as showed in FIG. 17.

Contrary to the related art, according to an embodiment, the bottom cover 140 is provided with a checking window 400 at a position where the connector 420 faces when the bottom cover 140 is assembled to the base chassis 110. As showed in FIG. 16, even if the bottom cover 140 is assembled to the base chassis 110, one can check through the checking window 400 whether the ground harness 410 is firmly connected to the connector 420. Accordingly, it becomes easy to check the connection of the ground harness 41 and the connector 42.

The heat radiation mechanism 300A will be described next. As showed in FIG. 15, two heat radiation mechanisms 300A, which are identical, are provided in this embodiment.

FIGS. 18 and 19 are enlarged side views showing the heat radiation mechanism 300A. The heat radiation mechanism 300A according to an embodiment is structured to radiate the heat generated by the semiconductor component 320 provided on the circuit board 310. Though the heat radiation mechanism according to this embodiment radiates the heat generated by the semiconductor component 320 as an electronic component, the present invention is not limited to the heat radiation for the semiconductor component 320, but applicable to other heat-generating components.

The semiconductor component 320 is fixed on the circuit board 310 by soldering the lead 330 to the circuit board 310 (solder 340). This semiconductor component 320 generates heat while it is activated so that the disk drive reads or writes information in the disk. A heat radiation sheet 370A is provided on the top face of the semiconductor component 320 (the semiconductor component 320 is upside down in FIGS. 18 and 19). This heat radiation sheet 370A is mainly made of silicone resin having high thermal conductivity. The heat radiation sheet 370A has high thermal conductivity. Since the main component of heat radiation sheet 370A is silicon, the heat radiation sheet 370A is flexible.

On the other hand, as described before, the bottom cover 140 opposing to the circuit board 310 is made of steel plate having high thermal conductivity. Additionally, the heat radiation unit 360 is formed on the bottom cover 140 at the position opposing to the semiconductor component 320. Accordingly, the bottom cover 140 is structured to approach the semiconductor component 320.

The bottom cover 140 (heat radiation unit 360) according to this embodiment is provided with a boss unit 380 protruding toward the electronic component at the position in which heat radiation sheet 370A touches the bottom cover 140. The boss unit 380 is formed on the bottom cover 140 as a monolith. The boss unit 380 according to this embodiment is shaped like a hemisphere and the bottom cover 140 according to this embodiment is provided with only one boss unit 380 at the center of the heat radiation unit 360. However, the shape of the boss unit 380 is not limited to a hemisphere, but can be another shape that increases the contact area with the heat radiation sheet 370A. The number of the boss units 380 is not limited to one, but can be a plurality in order to increase the contact area with the heat radiation sheet 370A.

By the way, the manufacturing of the disk drive 10 inevitably involves assembly error of the apparatus, manufacturing error of components, and tolerances (hereinafter, these are referred to as "assembly errors" as a whole). If the assembly errors are too great, the heat radiation sheet 370A and the bottom cover 140 (heat radiation unit 360) may separate (not be in contact).

However, the heat radiation mechanism according to the embodiment includes the boss unit 380 protruding toward the semiconductor component 320, the boss unit 380 formed on the bottom cover 140 at the position at which the bottom cover 140 touches the heat radiation sheet 370A. Accordingly, the boss unit 380 surely touches the heat radiation sheet 370A even if the distance between the semiconductor component 320 and the heat radiation unit 360 (bottom cover 140) exceeds a predetermined value due to the above assembly errors. That is why the height of the boss unit 380 is set at a value greater than the maximum value of the above assembly errors and the like.

Accordingly, even if the assembly errors exist, the bottom cover 140 surely touches the heat radiation sheet 370A, and consequently, the heat generated by the semiconductor component 320 is surely radiated by the bottom cover 140 through the heat radiation sheet 370A.

On the other hand, in the case where the heat radiation sheet 370A approaches the bottom cover 140 (heat radiation unit 360) due to the assembly error, the boss unit 380 presses hard the heat radiation sheet 370A. However, as described above, since the heat radiation sheet 370A is flexible, the force is absorbed by the flexibility of the heat radiation sheet 370A.

Accordingly, the structure having the boss unit 380 on the bottom cover 140 does not damage the bottom cover 140 and the semiconductor component 320. Additionally, because the bottom cover 140 (heat radiation unit 360) touches hard the heat radiation sheet 370A, the heat generated by the semiconductor component 320 is surely transferred to the bottom cover 140.

Figure 20:
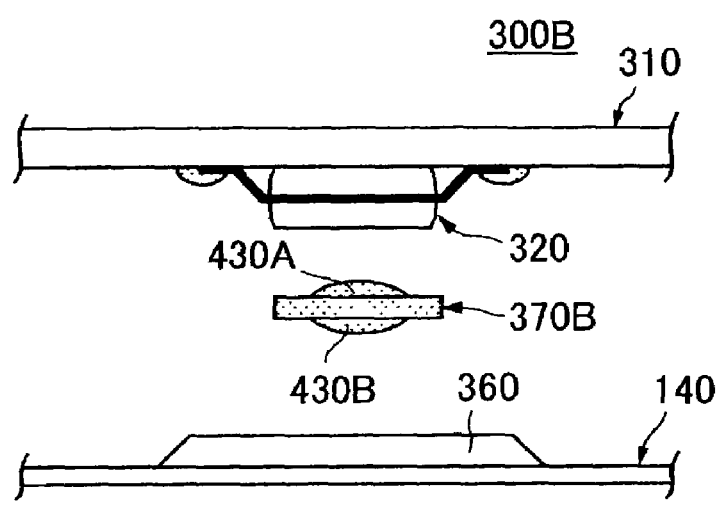
FIG. 20 is an expanded side view of a heat radiation mechanism according to another embodiment.

FIG. 20 is an enlarged side view of a heat radiation mechanism 300B according to another embodiment of the present invention. The heat radiation mechanism 300B is characterized in that boss units 430A and 430B are formed on the heat radiation sheet 370B.

As the boss units 430A and 430B are formed one on each side of the heat radiation sheet 370B that is provided between the semiconductor component 320 and the bottom cover 140, even if the distance between the semiconductor component 320 and the heat radiation unit 360 (bottom cover 140) becomes more than a predetermined value due to the assembly errors and the like, the boss units 430A and 430B touch the semiconductor component 320 and the bottom cover 140 (heat radiation unit 360). That is why the height of the boss units 430A and 430B is set at a value greater than the maximum value of the above assembly errors and the like. Accordingly, even if the assembly errors and the like occur, the semiconductor component 320 and the bottom cover 140 surely touch each other through the heat radiation sheet 370B, and the heat generated by the semiconductor component 320 is surely radiated.

On the other hand, in the case where the distance between the semiconductor component 320 and the bottom cover 140 (heat radiation unit 360) is shortened due to the assembly errors and the like, the boss units 430A and 430B are pressed hard by the semiconductor component 420 and the bottom cover 140 (heat radiation unit 360). However, since the heat radiation sheet 370B is also flexible, the force of the semiconductor component 320 and the heat radiation unit 360 pressing the boss units 430A and 430B is absorbed by the flexibility of the heat radiation sheet 370B, and the force does not cause the semiconductor component 320 and the bottom cover 140 to be damaged. Additionally, because the bottom cover 140 (heat radiation unit 360) touches hard the heat radiation sheet 370B, the heat generated by the semiconductor component 320 is surely transferred to the bottom cover 140 for radiation.

According to an aspect of the present invention, a heat radiation mechanism according to an embodiment includes an electronic component mounted on a circuit board, a heat radiation plate, a heat radiation sheet provided between the electronic component and the heat radiation plate, and a boss unit formed on the heat radiation plate at a position where the heat radiation plate touches the heat radiation sheet, the boss unit protruding toward the electronic component, wherein heat generated by the electronic component is transferred to the heat radiation plate through the heat radiation sheet.

Accordingly, in the case where the distance between the electronic component and the heat radiation plate exceeds a predetermined value due to assembly errors and the like, since the boss unit protruding toward the electronic component touches the heat radiation sheet, the heat generated by the electronic component is surely transferred to the heat radiation plate.

According to another aspect of the present invention, a heat radiation mechanism according to another embodiment includes an electronic component mounted on a circuit board, a heat radiation plate, a heat radiation sheet provided between the electronic component and the heat radiation plate, and one or more boss units formed on the heat radiation sheet at a position where the heat radiation sheet touches the electronic component and/or the heat radiation plate, wherein heat generated by the electronic component is transferred to the heat radiation plate through the heat radiation sheet.

Accordingly, in the case where the distance between the electronic component and the heat radiation plate exceeds a predetermined value due to assembly errors and the like, since the boss units formed on the heat radiation sheet touch the electronic component and the heat radiation plate, the heat generated by the electronic component is surely transferred to the heat radiation plate.

According to yet another aspect of the present invention, a heat radiation mechanism described above is characterized in that the heat radiation sheet is flexible.

Accordingly, in the case where the distance between the electronic component and the heat radiation plate becomes shorter than a predetermined value, since the force pressing the heat radiation sheet is absorbed by the flexibility of the heat radiation sheet, the force does not cause the electronic component and the heat radiation plate to be damaged.

The preferred embodiments of the present invention are described above. The present invention is not limited to these embodiments, but various variations and modifications may be made without departing from the scope of the present invention.

This patent application is based on Japanese priority patent application No. 2001-285132 filed on Sep. 19, 2001, and No. 2001-344692 filed on Nov. 9, 2001, the entire contents of which are hereby incorporated by reference.

What is claimed is:

1. An optical disk clamper holding mechanism that holds with a clearance, an optical disk clamper having a hub unit, an upper flange unit, and a lower flange unit, the mechanism comprising:
   a surrounding unit that holds said upper flange unit of the optical disk clamper;
   a flange unit that supports said upper flange unit of the optical disk clamper and holds said hub unit of the optical disk clamper, said flange unit protruding inwardly from said surrounding unit extending over a semicircular portion of the surrounding unit, the surrounding unit having a flange opening unit between edges in the circumferential direction;
   a rib formed protruding inwardly at a position opposing the flange opening unit, when said optical disk clamper moves in the direction of towards said flange opening unit, the rib stops a rim portion of said upper flange unit of said optical disk clamper, to reduce the clearance of said optical disk clamper in the direction of towards the opening unit, and when the optical disk clamper moves in a direction other than the direction towards the flange opening unit, an inner radial edge of the flange unit stops an outer surface of the hub unit of the optical disk clamper.

2. The optical disk clamper holding mechanism as claimed in claim 1, wherein width at the upper side of said rib is smaller than width at the lower side of said rib.

3. An optical disk drive, comprising:
   an optical disk clamper;
   a turntable that clamps an optical disk with said optical disk clamper;
   an optical head that reads information recorded in said optical disk while said optical disk is rotated by said turntable; and
   an optical disk clamper holding mechanism that holds with a clearance said optical disk clamper having a hub unit, an upper flange unit, and a lower flange unit, wherein said optical disk clamper holding mechanism further comprises:
      a surrounding unit that holds said upper flange unit of the optical disk clamper;
      a flange unit that supports said upper flange unit of the optical disk clamper and holds said hub unit of the optical disk clamper, said flange unit protruding inwardly from said surrounding unit extending over a semicircular portion of the surrounding unit, the surrounding unit having a flange opening unit between edges in the circumferential direction;
      a rib formed protruding inwardly at a position opposing the flange opening unit, when said optical disk clamper moves in the direction of said flange opening unit, the rib stops a rim portion of said upper flange unit of said optical disk clamper, to reduce the clearance of said optical disk clamper in the direction of towards the opening unit, and when the optical disk clamper moves in a direction other than the direction towards the flange opening unit, an inner radial edge of the flange unit stops an outer surface of the hub unit of the optical disk clamper.

4. The optical disk drive as claimed in claim 3, wherein width at the upper side of said rib is smaller than width at the lower side of said rib.

* * * * *